United States Patent [19]
Hemphill et al.

[11] Patent Number: 6,022,054
[45] Date of Patent: Feb. 8, 2000

[54] THIN WALL FIBERGLASS PIPE CONNECTORS

[75] Inventors: Duane G. Hemphill, Burkburnett; Joie L. Folkers, Wichita Falls, both of Tex.

[73] Assignee: Ameron International Corporation, Pasadena, Calif.

[21] Appl. No.: 09/045,050

[22] Filed: Mar. 20, 1998

[51] Int. Cl.[7] .................................................. F16L 47/06
[52] U.S. Cl. ........................ 285/398; 285/419; 285/915
[58] Field of Search ................................... 285/331, 371, 285/373, 397, 398, 419, 423, 915

[56] References Cited

U.S. PATENT DOCUMENTS

| Re. 22,782 | 8/1946 | Rembert | 285/423 X |
|---|---|---|---|
| 95,921 | 10/1869 | Mears | 285/397 |
| 1,005,153 | 10/1911 | Case | 285/397 X |
| 2,116,165 | 5/1938 | Ullman | 285/419 X |
| 2,209,402 | 7/1940 | Kepler. | |
| 3,044,657 | 7/1962 | Horton | 285/398 X |
| 3,689,114 | 9/1972 | Meserole | 285/373 |
| 3,796,057 | 3/1974 | Dougherty | 285/398 X |
| 4,172,607 | 10/1979 | Norton | 285/236 |
| 4,175,593 | 11/1979 | Sack | 138/110 |
| 4,344,719 | 8/1982 | Thom | 403/297 |
| 4,385,644 | 5/1983 | Kaempen | 138/109 |
| 4,465,309 | 8/1984 | Nimke et al. | 285/373 |
| 4,717,182 | 1/1988 | Behrens et al. | 285/230 |
| 4,746,150 | 5/1988 | Persson et al. | 285/286 |
| 4,927,189 | 5/1990 | Burkit | 285/109 |
| 5,061,000 | 10/1991 | Haugen et al. | 296/3 |
| 5,193,859 | 3/1993 | McKinnon | 285/417 |
| 5,823,581 | 10/1998 | Coppolo | 285/373 |

FOREIGN PATENT DOCUMENTS

| 732984 | 4/1966 | Canada | 285/373 |
|---|---|---|---|
| 2220736 | 10/1974 | France | 285/373 |
| 2631418 | 11/1989 | France | 285/373 |
| 512331 | 4/1976 | U.S.S.R. | 285/398 |

*Primary Examiner*—Lynne H. Browne
*Assistant Examiner*—Greg Binda
*Attorney, Agent, or Firm*—Christie, Parker & Hale, LLP

[57] ABSTRACT

A pipe coupling for two pipe ends having the same inner diameter includes a first pipe coupling joining the pipe ends. The first pipe coupling is formed from a section of pipe having approximately the same inner diameter as the pipe ends and is split longitudinally. A second pipe coupling is clamped over the location of the junction between the pipe ends. The second pipe coupling is formed from a section of pipe having approximately the same inner diameter as the pipe ends and is split longitudinally. The split of the second pipe coupling is offset from the split of the first pipe coupling. The couplings may include an inner and an outer coupling, two outer couplings, or an inner coupling and two outer couplings. Each inner coupling have a strip of material removed along its longitudinal split so that it can be compressed to substantially close the gap at its split and inserted into a pipe end. The pipe couplings may be adhering to the pipe ends and/or adjacent pipe couplings to provide a watertight seal about the pipe joint.

14 Claims, 4 Drawing Sheets

6,022,054

THIN WALL FIBERGLASS PIPE CONNECTORS

BACKGROUND OF THE INVENTION

The present invention relates to pipe couplings for coupling the ends of two pipes together and to methods of their manufacture.

The use of nonmetallic materials for drain pipes, such as those for use on bridges and buildings, has been attractive due to the ability of the pipes to resist corrosion and the pipes' light weight. Unsightly "rust stains" on exterior surfaces of bridges or buildings, characteristic of unprotected or compromised metallic components, are thereby eliminated. The use of nonmetallic materials for a conduit has also been attractive due to the ability of the conduits to resist corrosion and because such a conduit does not require cathodic protection. This is important because stray current in the ground, and induced currents within the conduit can cause severe corrosion to metal in a very short period of time due to galvanic attack. Fiberglass reinforced plastic (FRP) pipe has been used for sometime, to a limited extent, for both bridge drains and the conduit due to its corrosion resistance, light weight, and aesthetically pleasing appearance. A drawback to FRP pipe has been its relatively high cost compared to thin wall metallic pipe, especially at the joints.

Pipe couplings are used to couple or join the ends of two lengths of pipe together. Pipe couplings are basically sleeve-like devices, having a cylindrical passage therethrough for receiving the two pipes. In addition to coupling the ends of the pipes together, a pipe coupling provides seals around each pipe and prevents leakage from the joint.

Another typical application of pipe couplings occurs when a damaged section of pipe is replaced. A new pipe section is inserted in place of the old damaged section. Pipe couplings are used on each end of the new section of pipe to couple the section to the free ends of the in situ pipe.

There has been a need in the past for a cost effective, efficient and rapid means of connecting together pipe or tubing and for the repairing of faults or holes in such pipe or tubing without the necessity of cutting or dividing the pipe or tubing. Further, there has been a desire to provide a strong adhesive bond between the connector and the pipe or tubing to be bonded together or repaired.

SUMMARY OF THE INVENTION

According to one embodiment of the invention, a pipe coupling for two pipe ends having the same inner diameter includes a first pipe coupling joining the pipe ends. The first pipe coupling is formed from a section of one of the pipes to be coupled, having approximately the same inner and outer diameter, as the pipe ends, and is split longitudinally. The first pipe coupling is disposed between the two pipe ends. According to alternate embodiments, the first pipe coupling may be positioned either inside or outside of the two pipe ends at the junction. A second pipe coupling is clamped over the junction between the pipe ends. The second pipe coupling is formed from a section of pipe having approximately the same inner and outer diameter as the pipe ends and is split longitudinally. In the completed joint, the split of the second pipe coupling is offset from the split of the first pipe coupling, preferably by about 180°.

According to the various embodiments of the invention, the coupling may include an inner and an outer coupling, two outer couplings, or an inner coupling and two outer couplings. An inner coupling has a strip of material removed along its longitudinal split so that it can be compressed and inserted into each pipe end. The pipe couplings may be adhering to the pipe ends and/or adjacent pipe couplings to provide a watertight seal 360° about the pipe joint.

According to another embodiment, an expansion joint is provided by adhering a rear half of an inner coupling and a rear half of an outer coupling to one pipe end and sliding the other pipe end into the annular slot formed between the couplings.

In order to assemble a pipe joint according to one embodiment, an inner coupling is compressed to substantially close the gap at its split and about half of its length is inserted into one of the pipe ends. The other pipe end is then pushed over the other half of the inner coupling. An external coupling is expanded at its split and clipped onto the junction between the pipe ends and an underlying external pipe joint previously clipped onto the junction.

BRIEF DESCRIPTION OF THE DRAWINGS

The foregoing features and advantages of the invention will be better understood by referring to the following drawings.

DETAILED DESCRIPTION OF THE PREFERRED EMBODIMENTS

Figure 1:
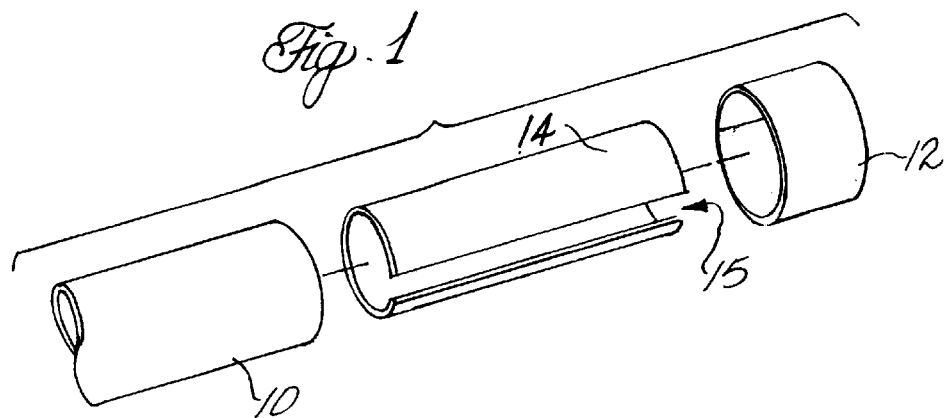
FIG. 1 is a perspective view of pipe couplings according to the invention cut from a pipe end to be joined.

According to a preferred embodiment, sections of pipe are cut from a pipe end for use as coupling members. The pipe sections are split longitudinally for use as either an internal pipe coupling, with a strip of material removed, which is inserted inside the pipe ends or an outer pipe coupling which is "snapped" over the outside of two joined pipe ends. Adhesive may be used between the pipe couplings and pipe ends to provide a watertight seal 360° around the pipe connection.

For piping applications that do not require a smooth surface inside the pipe, i.e., continuous inside diameters, such as a drain pipe, the pipe coupling includes an inner coupling to fit inside the pipe ends and an outer coupling to fit over the joint.

Alternatively, for piping applications that do require a smooth surface inside the pipe, such as conduit, no inner coupling is used, but rather two outer couplings are fit over the joint.

The thicknesses of the pipe walls and the adhesive layers are exaggerated in the drawings to better represent the structure of the joint.

Referring to FIG. 1, in one embodiment the pipe couplings are cut from one of the pipes 10 to be joined. An inner coupling 14 is cut to a preferred length approximately twice the length of the nominal diameter of the pipe. The inner coupling 14 is then split longitudinally and an extra strip of material is removed along the split. The width of the removed strip is that required to allow the outer surface of the inner coupling 14 to fit snugly inside the pipe ends 16,18 when it is compressed to close the gap 15 at the split. An external coupling 12 is also cut from pipe 10, preferably to a length of from about one-half to twice the nominal diameter of the pipe and is also split longitudinally.

Preferably, pipe 10 is a filament-wound "E" type fiberglass reinforced thermosetting anhydride cured epoxy with exterior UV resistant coating made in accordance with ASTM 2996 RTRP#11aa-111 Preferably the pipe has a nominal size ranging from about 4 to 16 inches with a wall thickness of between about 0.05 to 0.115 inches. However, it is understood that pipe connectors of this invention can be used with other commonly used FRP pipe.

Prior to joining first pipe end 16 to second pipe end 18, the internal surface of the pipe ends to be joined and the external surface of inner coupling 14 are cleaned with sand paper to remove any contaminants. The resultant dust is then removed from the sanded surfaces.

A liberal quantity of adhesive is applied to the inside of both pipe ends 16,18 to be assembled and to half of the outside surface of the internal coupling 14, including the cut ends of both pipe ends and the internal coupling. A preferred adhesive is Ameron PSX-34 ambient-cure two-part epoxy. However, other commonly used adhesives can be used. The internal coupling 14 is then compressed to substantially close the gap at the split and then the coated half is inserted into the end of pipe joint 16. Adhesive is then applied to the outside surface of the other half of the inner coupling 14. Second pipe end 18 is then pushed onto the exposed half of inner coupling 14. It may be necessary to rotate the pipe ends 16,18 at the joint to close the gap between the pipe ends. The pipe ends should be square-cut and pushed as close together as possible.

Figure 2:
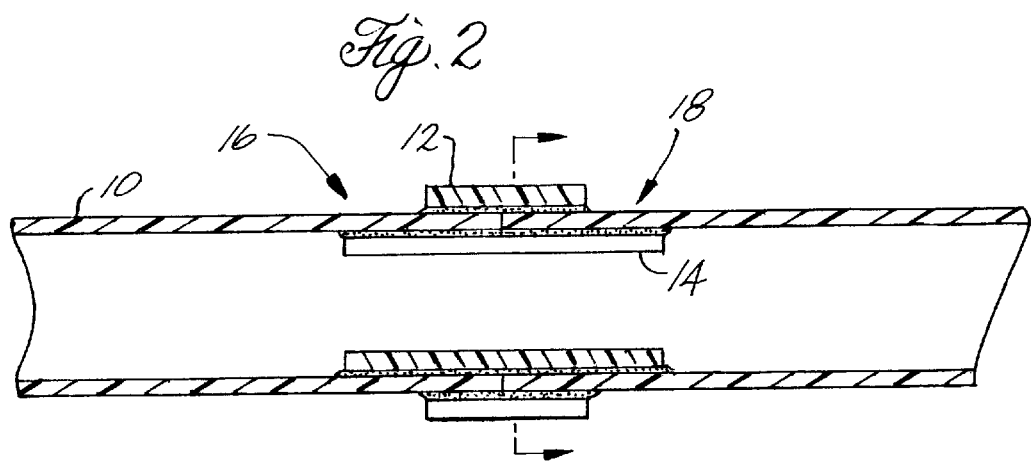
FIG. 2 is a longitudinal sectional view of one embodiment of a pipe coupling according to the invention taken along lines 2—2 of FIG. 3.

External coupling 12 is then expanded at its split and snapped over the joint, sealing any excess adhesive that may have squeezed between the pipe ends. If desired, the internal surface of external coupling 12 can be sanded and coated with adhesive prior to being snapped over the joint to ensure that the gap in the inner coupling is surrounded by an uninterrupted line of adhesive. FIG. 2 illustrates the completed pipe joint.

Preferably worm gear hose clamps are clamped to the extreme ends of the external coupling 12 until the epoxy is cured.

Figure 3:
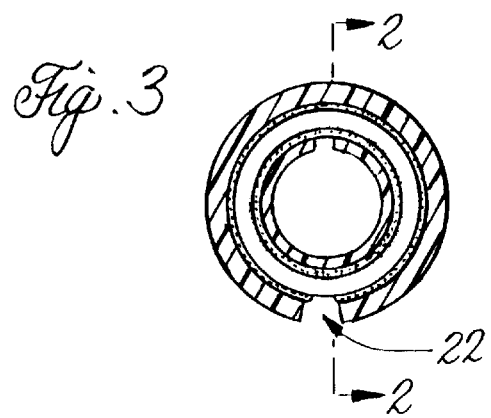
FIG. 3 is a cross sectional view of the embodiment shown in FIG. 2 taken along lines 3—3 of FIG. 2.

As shown in FIG. 3, a gap 22 occurs at the split due to the smaller inner diameter of external pipe coupling 12 compared to the outer diameter of the pipe ends 16,18. Preferably the gap is placed 180° relative to the split of the inner coupling 14 or in a position where it is least noticeable, e.g., facing the surface to which the pipe joint is adjacent such as a wall or the ground. The adhesive provides a 360° seal around the pipe joint, acting as a sealant for the joint.

Alternatively, if a watertight seal is not required at the joint, the use of adhesive as well as the cleaning steps can be eliminated. The above-described coupling method so modified provides a very simple and rapid process for constructing a pipe joint and is especially well-suited for infield repairs. Assembling such a joint without adhesive is adequate for buried or fully supported pipe lines. However, it is generally not adequate for pipe lines which experience some bending load, such as on a bridge drain with the joint positioned between supports.

Figure 4:
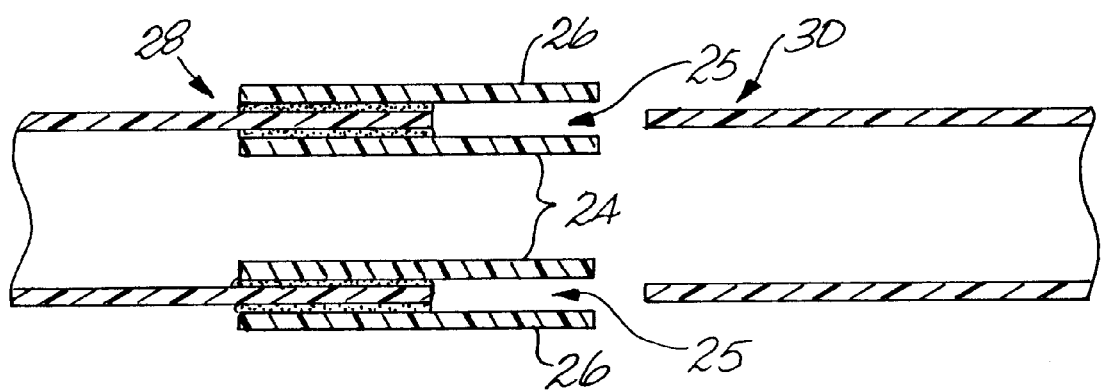
FIG. 4. is a longitudinal sectional view of an expansion joint according to another embodiment of the invention.

According to another embodiment, an expansion joint is provided, as shown in FIG. 4. Inner coupling 24 and outer coupling 26 are each cut from a section of pipe of the same type as the pipe ends 28,30 to be joined. Both couplings are split longitudinally. Inner coupling 24 has a strip of material removed along its longitudinal split as described above. Both inner coupling 24 and outer coupling 26 are cut to a length approximately twice the length of the nominal diameter of the pipe ends to be joined.

The internal surface of first pipe end 28 and the external surface of inner coupling 24 are cleaned with sand paper to remove any contaminants. The resultant dust is then removed from the sanded surfaces.

A liberal quantity of adhesive is applied to the internal surface of first pipe end 28 and to about half the length of the inner coupling external surface. The inner coupling 24 is compressed to substantially close the gap at the split and then the coated half is inserted into the first pipe end 28.

The external surface of first pipe end 28 and internal surface of outer coupling 26 are cleaned as described above. The outer surface of first pipe end 28 is wet with adhesive and a liberal quantity of adhesive is applied to about half the length of the internal surface of the outer coupling 26. The coated half of the outer coupling is then expanded at its split and snapped over the coated exterior of first pipe end 28. Preferably the split of the outer coupling is rotated 180° relative to the split of the inner coupling 24, or in a position where it is least noticeable.

Preferably worm gear hose clamps are clamped to outer coupling 26 until the epoxy is cured.

As shown in FIG. 4, an annular slot 25 is formed between inner and outer couplings 24,26 into which second pipe end 30 is inserted. The second pipe end can "float" in the joint due to lack of an adhesive bond therewith to compensate for relative movement between the pipes caused by, e.g., thermal expansion or lateral movement due to wind.

According to yet another embodiment, a pipe coupling is provided for a pipe joint in which it is desirable to have a smooth transition between pipe sections, that is, with no "seam" or rather a continuous inside diameter between pipe sections. This feature is important for an electrical conduit because pull wires or electrical cables can get caught on the seam during the pulling operation.

Figure 5:
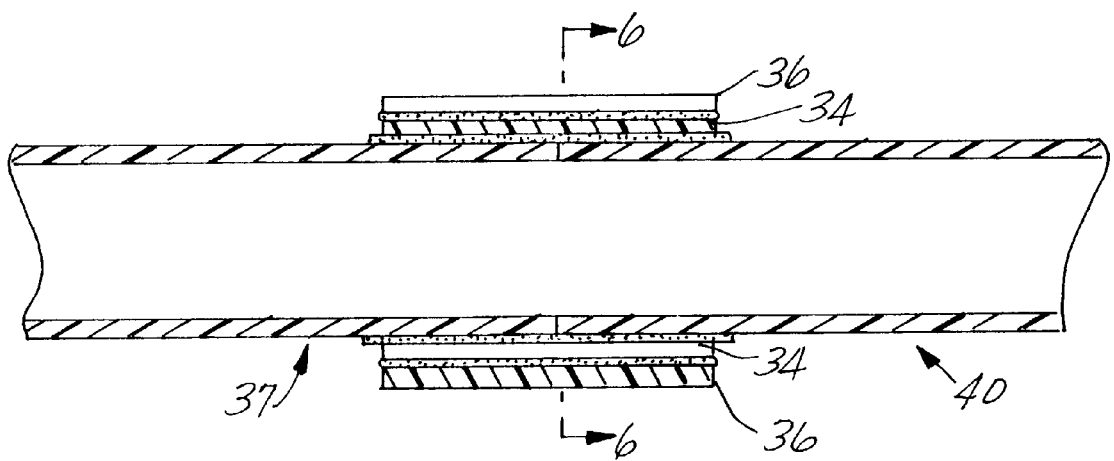
FIG. 5 is a longitudinal sectional view of another embodiment of a pipe coupling according to the invention taken along lines 5—5 of FIG. 6.

Referring to FIG. 5, first outer coupling 34 and second outer coupling 36 are cut from a section of pipe of the same type as the pipe ends 37,40 to be joined. Both couplings are split longitudinally and cut to a length approximately twice the length of the nominal diameter of the pipe ends to be joined.

To assemble the joint, the pipe ends 37,40 are brought into abutting alignment and first outer coupling 34 is expanded at its split and clipped over the joint between the pipe ends. Second outer coupling 36 is then similarly clipped over the first outer coupling 34.

Figure 6:
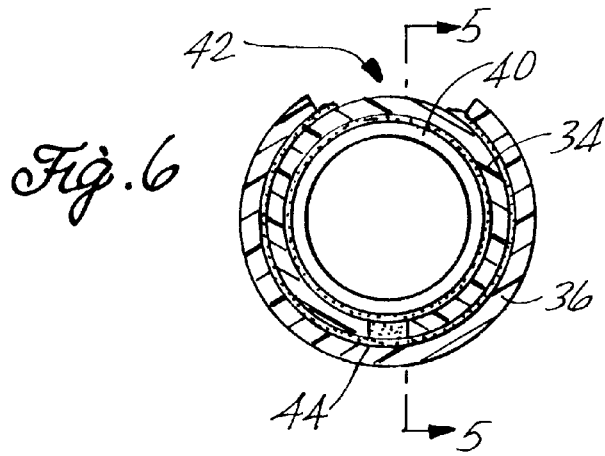
FIG. 6 is a cross sectional view of the embodiment shown in FIG. 5 taken along lines 6—6 of FIG. 5.

Preferably the gap 42 at the split of the second outer coupling 36 is placed 180° relative to the gap 44 at the split of the second outer coupling 34, as shown in FIG. 6, or in a position where it is least noticeable.

Adhesive may be applied between the pipe ends 37,40 and the first outer coupling 34, and among the first outer coupling 34 and the second outer coupling 36 in order to provide a 360° watertight seal around the pipe joint. Preferably, enough adhesive is used to fill the gap 44 of the first outer coupling. The procedures for cleaning the pipe surfaces and applying adhesive are described above.

This type of pipe coupling is also useful for repairing damaged pipe. Instead of connecting two pipe ends, the outer coupling can be clipped directly over a damaged portion of pipe in order to close the pipe.

Figure 7:
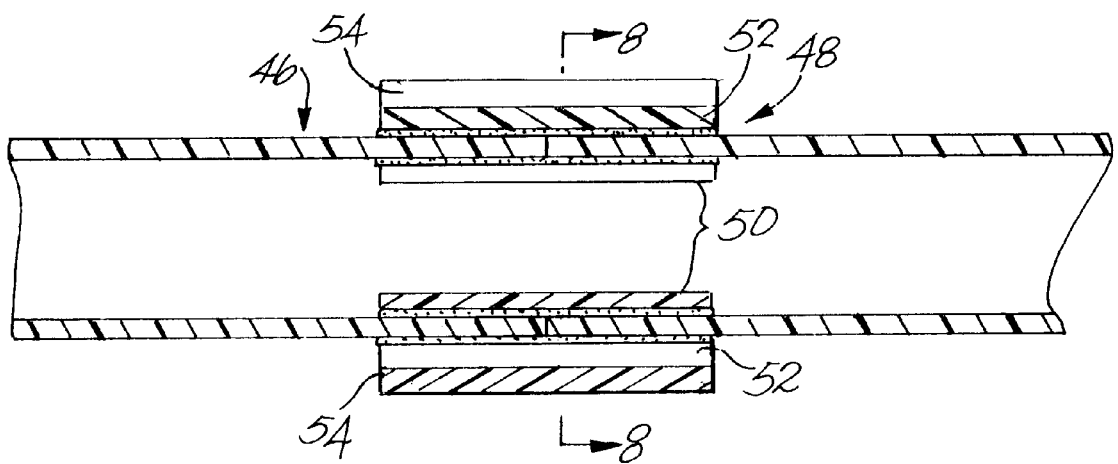
FIG. 7 is a longitudinal sectional view of another embodiment of a pipe coupling according to the invention taken along lines 7—7 of FIG. 8.

According to a further embodiment, three pipe couplings are used to join two pipe ends. The pipe couplings consist of an inner coupling 50, a first outer coupling 52, and a second outer coupling 54, as shown in FIG. 7. All three couplings are cut from a section of pipe of the same type as the pipe ends 46,48 to be joined. All three couplings are split longitudinally and cut to a length approximately twice the length of the nominal diameter of the pipe. The inner coupling 50 has a strip of material removed along its longitudinal split as described above.

To assemble the joint, the inner coupling 50 is compressed to substantially close the gap at the split and then about half of the inner coupling is inserted into the pipe end 28. Second pipe end 48 is then pushed onto the outer surface of the other half of inner coupling 50. It may be necessary to rotate the pipe ends 46,48 at the joint to close the gap between the pipe ends. The pipe ends should be closed to ensure a 360° seal around the pipe joint.

First outer coupling 52 is then expanded at its split and snapped over the joint. Preferably the gap 56 of the first outer coupling is placed 180° relative to the split 58 of the inner coupling.

Second outer coupling 54 is then similarly clipped over the first outer coupling 52. Preferably the gap 60 of the second outer coupling is placed 180° relative to the gap 56 of the first outer coupling 52, or in a position where it is least noticeable.

Figure 8:
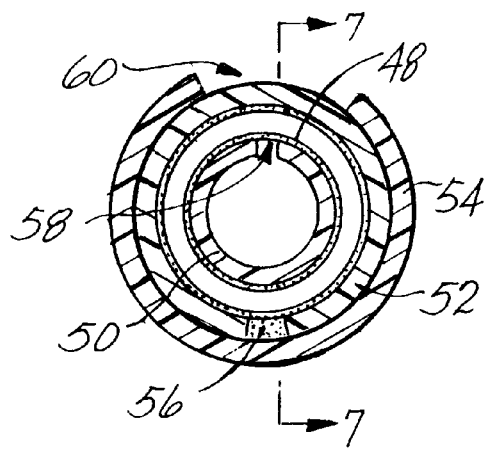
FIG. 8 is a cross sectional view of the embodiment shown in FIG. 7 taken along lines 8—8 of FIG. 7.

In order to provide a 360° watertight seal around the pipe joint, adhesive may be applied between the pipe ends 46,48 and the inner coupling 50, between the pipe ends and the first outer coupling 52, and between the first outer coupling 52 and the second outer coupling 54. Preferably, enough adhesive is used to fill the gap 56 of the first outer coupling, as shown in FIG. 8. The procedures for cleaning pipe surface and applying adhesive are described above.

According to the invention, a section of pipe identical to the pipe ends to be joined may be used as a pipe coupling. This provides a simple and convenient coupling which is easy to assemble and made from readily available materials. This type of pipe coupling is also ideal for general use in the field and in emergency situations in which a standard pipe coupling is not available. Sections of pipe used to construct a coupling according to the invention can be cut directly from one or both of the pipe ends to be joined. Alternatively, a pipe section of the type to be joined could be cut into coupling members at a remote location for use in the field.

A joint made in this manner provides a low profile connection, nearly invisible to the casual observer. It also provides a means to field fabricate joints should the number of joint components ordered from the factory be too few.

The characteristics required of pipe used for this type of coupling are that the pipe have smooth internal and external surfaces, resilience or "shape memory," and flexibility so that it can be "spread out" and clipped onto the outside surface of a similarly sized pipe. A relatively thin wall is preferred, but is not required.

Although the present invention has been described with respect to particular embodiments, those skilled in the art will appreciate that the present invention may be modified without departing from the scope of the invention. Accordingly, all such modifications are intended to be included within the scope of the invention as defined by the following claims.

We claim:

1. A pipe coupling comprising:
   a first pipe end;
   a second pipe end abutting the first pipe end to form a junction between said pipe ends, each of the pipe ends having approximately the same inner diameter;
   a first pipe coupling member placed across the junction and joining the first and second pipe ends, wherein the first pipe coupling member comprises a section of pipe having a single slit that extends longitudinally therealong and that has approximately the same inner diameter as the inner diameter of the first and second pipe ends when in a relaxed state; and
   a second pipe coupling member clamped over the first pipe coupling member and the junction, wherein the second pipe coupling member comprises a section of pipe having a single slit that extends longitudinally therealong and that has approximately the same inner diameter as the inner diameter of the first and second pipe ends when in a relaxed state.

2. The pipe coupling as recited in claim 1 wherein the first pipe coupling member is disposed within both pipe end diameters across the junction, and wherein the second pipe coupling member is disposed over both pipe ends across the junction.

3. The pipe coupling as recited in claim 2 wherein the slits of each respective first and second pipe coupling member are positioned offset from one another.

4. A pipe coupling comprising:
   a first pipe end;
   a second pipe end abutting the first pipe end to form a junction between said pipe ends, each of the pipe ends having approximately the same inner diameter;
   a first pipe coupling member comprising a section of pipe having approximately the same inner diameter as the inner diameter of the first and second pipe ends when in a relaxed state and having a single slit that extends along its length, the first pipe coupling member being disposed within both pipe end diameters across the function thereby joining the pipe ends; and
   a second pipe coupling member disposed over the junction between the pipe ends, wherein the second pipe coupling member comprises a section of pipe having approximately the same inner diameter as the inner diameter of the first and second pipe ends when in a relaxed state and which includes a single slit that extends longitudinally therealong.

5. The pipe coupling of claim 4 wherein the first and second pipe coupling members are positioned along the junction so that the respective slits are offset at an angle from one another.

6. The pipe coupling of claim 4 wherein each of the first and second pipe coupling members is a fiber reinforced plastic pipe section.

7. The pipe coupling of claim 4 wherein each of the first and second pipe ends is a fiber reinforced plastic pipe section.

8. The pipe coupling of claim 4 wherein the first pipe coupling member has a length that is about twice a nominal diameter of the first and second pipe ends, and wherein the second pipe coupling member has a length that is between about one-half to twice a nominal diameter of the first and second pipe ends.

9. The pipe coupling of claim 4 further comprising adhesive interposed between the first pipe coupling member and said pipe ends, and adhesive interposed between the second pipe coupling member and said pipe ends.

10. The pipe coupling of claim 4 further comprising a third pipe coupling member clamped over the second pipe coupling member, wherein the third pipe coupling member comprises a section of pipe having approximately the same inner diameter as the first and second pipe ends and which include a slit that extends longitudinally along the pipe.

11. The pipe coupling of claim 10 wherein each of the first, the second, and the third pipe members has a length that is about twice a nominal diameter of the first and second pipe ends.

12. The pipe coupling of claim 10 further comprising adhesive interposed between the first pipe coupling member and said pipe ends, adhesive interposed between the second pipe coupling member and said pipe ends, and adhesive interposed between the third pipe coupling member and the second pipe coupling member.

13. The pipe coupling of claim 4 wherein the first and second pipe coupling members are adhered to the first pipe end but not to the second pipe end such that the second pipe end is movable in an annular slot formed between the first and second pipe members.

14. The pipe coupling of claim 13 wherein each of the first and the second pipe coupling members have a length that is about twice a nominal diameter of the first and second pipe ends.

* * * * *